(12) United States Patent
Ogai

(10) Patent No.: US 10,872,443 B2
(45) Date of Patent: Dec. 22, 2020

(54) PROGRAM AND INFORMATION PROCESSING APPARATUS

(71) Applicant: D&P Media Co., Ltd., Chiba (JP)

(72) Inventor: Masanao Ogai, Chiba (JP)

(73) Assignee: D&P Media Co., Ltd., Chiba (JP)

( * ) Notice: Subject to any disclaimer, the term of this patent is extended or adjusted under 35 U.S.C. 154(b) by 20 days.

(21) Appl. No.: 16/164,938

(22) Filed: Oct. 19, 2018

(65) Prior Publication Data

US 2019/0122396 A1   Apr. 25, 2019

(30) Foreign Application Priority Data

Oct. 24, 2017  (JP) ................. 2017-205585

(51) Int. Cl.
*G06T 11/00* (2006.01)
*G06T 7/90* (2017.01)
(Continued)

(52) U.S. Cl.
CPC .............. *G06T 11/001* (2013.01); *G06F 8/20* (2013.01); *G06F 9/44526* (2013.01);
(Continued)

(58) Field of Classification Search
CPC ..................... G06T 11/001; G06T 7/90; G06T 2207/10024; G06F 9/453; G06F 8/20;
(Continued)

(56) References Cited

U.S. PATENT DOCUMENTS

2004/0085327 A1* 5/2004 Jones .................... G09B 29/003
                                                    345/591
2006/0132871 A1* 6/2006 Beretta .................... H04N 1/62
                                                    358/518

FOREIGN PATENT DOCUMENTS

JP    2001-331164 A    11/2001
JP    2006-350066 A    12/2006
(Continued)

OTHER PUBLICATIONS

Tableau ("5 tips on designing colorblind-friendly visualizations", 2016, https://www.tableau.com/about/blog/2016/4/examining-data-viz-rules-dont-use-red-green-together-53463) (Year: 2016).*

(Continued)

*Primary Examiner* — Xin Sheng
(74) *Attorney, Agent, or Firm* — Nakanishi IP Associates, LLC

(57) ABSTRACT

A program provides a color palette which is provided as a plug-in for content creation software as a user interface to cause a computer to implement means for determining color difference identifiability of other colors with respect to a specified color specified by a user among a plurality of colors provided in a plurality of color parts that constitute the color palette for each of the non-handicapped, the color vision handicapped and the elderly, means for determining brightness difference identifiability of other colors with respect to the specified color among the plurality of colors for each of the non-handicapped, the color vision handicapped and the elderly, means for identifying a color group for which the non-handicapped or the like are commonly provided with identifiability for color differences and brightness differences based on the color difference identifiability and the brightness difference identifiability and means for switching a display mode of each of the color parts between a user specifiable mode and a user unspecifiable mode according to the specified color group.

5 Claims, 8 Drawing Sheets

(51) Int. Cl.
  *G09G 5/06* (2006.01)
  *G06F 9/451* (2018.01)
  *G06F 9/445* (2018.01)
  *G06F 8/20* (2018.01)

(52) U.S. Cl.
  CPC ............... *G06F 9/453* (2018.02); *G06T 7/90* (2017.01); *G09G 5/06* (2013.01); *G06T 2207/10024* (2013.01); *G09G 2320/0666* (2013.01); *G09G 2354/00* (2013.01)

(58) Field of Classification Search
  CPC ................. G06F 9/44526; G09G 5/06; G09G 2320/0666; G09G 2354/00
  See application file for complete search history.

(56) References Cited

FOREIGN PATENT DOCUMENTS

| | | |
|---|---|---|
| JP | 2007-240508 A | 9/2007 |
| JP | 2007-293832 A | 11/2007 |
| JP | 2011-166558 A | 8/2011 |
| JP | 2014-21702 A | 2/2014 |

OTHER PUBLICATIONS

Mari Tashiro, "The universal design which considers from foundation edited by a UD universal design color to practical knowledge from color pressed down firmly", MdN, Japan, MdN Corporation, Inc., Jun. 8, 2010, the 195th volume, p. 78-79, with English Translation (6 pages).

\* cited by examiner

L*a*b* TABLE FOR NON-HANDICAPPED

| COLOR NUMBER | COLORIMETRY L*a*b* | | |
|---|---|---|---|
| | L* VALUE | a* VALUE | b* VALUE |
| 1 | 21.0 | 1.0 | -31.0 |
| 2 | 57.0 | -11.0 | -40.0 |
| 3 | 77.0 | -20.0 | -29.0 |
| 4 | 55.0 | -25.0 | -26.0 |
| 5 | 87.0 | -16.0 | 36.0 |
| | | | |
| | | | |
| 144 | 60.0 | 51.0 | 63.0 |

FIG.4A

L*a*b* TABLE FOR 1-TYPE 2-COLOR VISION (P-TYPE) HANDICAPPED

| COLOR NUMBER | COLORIMETRY L*a*b* | | |
|---|---|---|---|
| | L* VALUE | a* VALUE | b* VALUE |
| 1 | 25.0 | 5.0 | -31.0 |
| 2 | 61.0 | 4.0 | -30.0 |
| 3 | 77.0 | 3.0 | -19.0 |
| 4 | 55.0 | 2.0 | -27.0 |
| 5 | 86.0 | -4.0 | 36.0 |
| | | | |
| | | | |
| 144 | 48.0 | -2.0 | 17.0 |

FIG.4B

L*a*b* TABLE FOR 2-TYPE 2-COLOR VISION (D-TYPE) HANDICAPPED

| COLOR NUMBER | COLORIMETRY L*a*b* | | |
|---|---|---|---|
| | L* VALUE | a* VALUE | b* VALUE |
| 1 | 25.0 | 5.0 | -31.0 |
| 2 | 58.0 | 5.0 | -35.0 |
| 3 | 74.0 | 2.0 | -21.0 |
| 4 | 39.0 | 5.0 | -36.0 |
| 5 | 93.0 | -4.0 | 40.0 |
| | | | |
| | | | |
| 144 | 46.0 | -1.0 | 7.0 |

FIG.4C

L*a*b* TABLE FOR ELDERLY

| COLOR NUMBER | COLORIMETRY L*a*b* | | |
|---|---|---|---|
| | L* VALUE | a* VALUE | b* VALUE |
| 1 | 15.0 | -6.0 | -15.0 |
| 2 | 46.0 | -28.0 | -9.0 |
| 3 | 61.0 | -27.0 | -0.0 |
| 4 | 43.0 | 15.0 | -2.0 |
| 5 | 70.0 | -16.0 | 45.0 |
| | | | |
| | | | |
| 144 | 45.0 | 50.0 | 35.0 |

DETERMINATION RESULT OF NON-HANDICAPPED

| COLOR NUMBER | COLORIMETRY L*a*b* | | | ΔE76 DETERMINATION | ΔE00 DETERMINATION | ΔL DETERMINATION | COMPREHENSIVE DETERMINATION |
|---|---|---|---|---|---|---|---|
| | L* VALUE | a* VALUE | b* VALUE | | | | |
| 1 | 21.0 | 1.0 | -31.0 | | | | |
| 2 | 57.0 | -11.0 | -40.0 | ○ | ○ | ○ | ○ |
| 3 | 77.0 | -20.0 | -29.0 | ○ | ○ | ○ | ○ |
| 4 | 55.0 | -25.0 | -26.0 | ○ | ○ | ○ | ○ |
| 5 | 87.0 | -16.0 | 36.0 | ○ | ○ | ○ | ○ |
| | | | | | | | |
| 144 | 60.0 | 51.0 | 63.0 | ○ | ○ | ○ | ○ |

FIG.7B

DETERMINATION RESULT OF
1-TYPE 2-COLOR VISION (P-TYPE) HANDICAPPED

| COLOR NUMBER | COLORIMETRY L*a*b* | | | ΔE76 DETERMINATION | ΔE00 DETERMINATION | ΔL DETERMINATION | COMPREHENSIVE DETERMINATION |
|---|---|---|---|---|---|---|---|
| | L* VALUE | a* VALUE | b* VALUE | | | | |
| 1 | 25.0 | 5.0 | -31.0 | | | | |
| 2 | 61.0 | 4.0 | -30.0 | ○ | ○ | ○ | ○ |
| 3 | 77.0 | 3.0 | -19.0 | ○ | ○ | ○ | ○ |
| 4 | 55.0 | 2.0 | -27.0 | ○ | ○ | ○ | ○ |
| 5 | 86.0 | -4.0 | 36.0 | ○ | ○ | ○ | ○ |
| | | | | | | | |
| 144 | 48.0 | -2.0 | 17.0 | ○ | ○ | × | × |

FIG.7C

DETERMINATION RESULT OF
2-TYPE 2-COLOR VISION (D-TYPE) HANDICAPPED

| COLOR NUMBER | COLORIMETRY L*a*b* | | | ΔE76 DETERMINATION | ΔE00 DETERMINATION | ΔL DETERMINATION | COMPREHENSIVE DETERMINATION |
|---|---|---|---|---|---|---|---|
| | L* VALUE | a* VALUE | b* VALUE | | | | |
| 1 | 25.0 | 5.0 | -31.0 | | | | |
| 2 | 58.0 | 5.0 | -35.0 | ○ | ○ | ○ | ○ |
| 3 | 74.0 | 2.0 | -21.0 | ○ | ○ | ○ | ○ |
| 4 | 39.0 | 5.0 | -36.0 | ○ | × | × | × |
| 5 | 93.0 | -4.0 | 40.0 | ○ | ○ | ○ | ○ |
| | | | | | | | |
| 144 | 46.0 | -1.0 | 7.0 | ○ | ○ | × | × |

DETERMINATION RESULT OF ELDERLY

| COLOR NUMBER | COLORIMETRY L*a*b* | | | ΔE76 DETERMINATION | ΔE00 DETERMINATION | ΔL DETERMINATION | COMPREHENSIVE DETERMINATION |
|---|---|---|---|---|---|---|---|
| | L* VALUE | a* VALUE | b* VALUE | | | | |
| 1 | 15.0 | -6.0 | -15.0 | | | | |
| 2 | 46.0 | -28.0 | -9.0 | ○ | ○ | ○ | ○ |
| 3 | 61.0 | -27.0 | -0.0 | ○ | ○ | ○ | ○ |
| 4 | 43.0 | 15.0 | -2.0 | ○ | ○ | × | × |
| 5 | 70.0 | -16.0 | 45.0 | ○ | ○ | ○ | ○ |
| ... | | | | | | | |
| 144 | 45.0 | 50.0 | 35.0 | ○ | ○ | × | × |

FIG.7D

INTEGRATION OF DETERMINATION RESULTS

| COLOR NUMBER | COMPREHENSIVE DETERMINATION RESULT OF NON-HANDICAPPED | COMPREHENSIVE DETERMINATION RESULT OF 1-TYPE 2-COLOR VISION (P-TYPE) HANDICAPPED | COMPREHENSIVE DETERMINATION RESULT OF 2-TYPE 2-COLOR VISION (D-TYPE) HANDICAPPED | COMPREHENSIVE DETERMINATION RESULT OF ELDERLY | INTEGRATION RESULT |
|---|---|---|---|---|---|
| 1 | | | | | |
| 2 | ○ | ○ | ○ | ○ | ○ |
| 3 | ○ | ○ | ○ | ○ | ○ |
| 4 | ○ | ○ | × | × | × |
| 5 | ○ | ○ | ○ | ○ | ○ |
| ... | | | | | |
| 144 | ○ | × | × | × | × |

FIG.7E

PROGRAM AND INFORMATION PROCESSING APPARATUS

CROSS-REFERENCE TO RELATED APPLICATIONS

This application is based upon and claims the benefit of priority from the prior Japanese Patent Application No. 2017-205585, filed Oct. 24, 2017 the entire contents of which are incorporated herein by reference.

FIELD

Embodiments described herein relate generally to a program and an information processing apparatus for providing a color palette as a user interface which is provided as a plug-in for content creation software for creating a content such as a document, a design or an image.

BACKGROUND

Contents such as documents, designs or images are generally expressed in multiple colors. Use of multiple colors is expected to improve viewability and intuition, and further increase an amount of information. It is important that such contents be easily visible to the non-handicapped, the color vision handicapped or the elderly and be provided without deterioration of information. Therefore, various techniques are under study which correct colors of a content created for the non-handicapped into colors identifiable to the color vision handicapped (Japanese Patent Laid-Open No. 2007-293832). Techniques that allow the color vision handicapped to select only identifiable colors when determining a color scheme of a content are also under development (Japanese Patent Laid-Open No. 2001-331164).

However, even such techniques may not be able to prevent a situation in which colors of the same content are actually viewed differently between the non-handicapped and the color vision handicapped, failing to make them understand each other or a situation in which while a content is easily identifiable for the color vision handicapped, the content is hardly identifiable for each of the non-handicapped or the elderly.

Furthermore, Japanese Patent Laid-Open No. 2007-240508 discloses a method of designing a color scheme using a color chart for the non-handicapped in which brightness is fixed and chroma is changed and a color chart obtained by converting the color chart for the color vision handicapped, and a color chart for the non-handicapped in which chroma is fixed and brightness is changed and a color chart obtained by converting the color chart for the color vision handicapped.

However, this method needs to determine colors one at a time while following the four color charts, which requires considerable time and effort. It is undeniable that it depends on the user's skill whether or not the color scheme is easily identifiable to the color vision handicapped and does not cause the non-handicapped to have an uncomfortable feeling. In addition, this method remains at a level of comparison between two colors and is actually unable to design a color scheme with three or more colors.

It is an object of the present invention to provide a program and an information processing apparatus supporting all the non-handicapped, the color vision handicapped and the elderly in selections of commonly and clearly identifiable colors.

SUMMARY OF THE INVENTION

A program for providing a color palette which is provided as a plug-in for content creation software as a user interface according to the present embodiment causes a computer to implement means for determining color difference identifiability of other colors with respect to a specified color specified by a user among a plurality of colors provided in a plurality of color parts that constitute the color palette for each of the non-handicapped, the color vision handicapped and the elderly, means for determining brightness difference identifiability of other colors with respect to the specified color among the plurality of colors for each of the non-handicapped, the color vision handicapped and the elderly, means for identifying a color group for which the non-handicapped, the color vision handicapped and the elderly are commonly provided with color difference identifiability and brightness difference identifiability based on the color difference identifiability and the brightness difference identifiability and means for switching a display mode of each of the color parts that constitute the color palette between a user specifiable active mode and a user unspecifiable inactive mode according to the identified color group.

BRIEF DESCRIPTION OF THE VIEWS OF THE DRAWING

FIGS. 4A, 4B, 4C, and 4D are diagrams illustrating examples of L*a*b* tables stored in the storage apparatus in FIG. 1;

FIGS. 7A, 7B, 7C, 7D, and 7E are diagrams illustrating examples of comprehensive determination processing results and integration processing results in FIG. 5.

DETAILED DESCRIPTION

Hereinafter, a color palette providing program and an information processing apparatus according to an embodiment of the present invention will be described with reference to the accompanying drawings. The color palette providing program is provided as a plug-in for content creation software for creating a content such as a document, a design or an image, and functions as a user interface.

Note that in the present embodiment, colors will be handled in an L*a*b* color space. As is well known, an apparent color density is represented by a brightness index L* value, and hue and chroma are represented by an a* value and a b* value called "psychometric chroma coordinates." A brightness difference $\Delta L$ is given as a difference in the L* value between two colors. The color difference between two colors is a perceptual difference between two colors quantified using the L* value, the a* value and the b* value, and various indices are used, and, for example, $\Delta E76$ as the simplest index is given as a distance between two color points in the L*a*b* color space. For example, a color difference ΔE00 between two colors is calculated by a calculation expression defined so that the color difference based on the calculation approximates to a color identification region of human eyes in the L*a*b* color space. Since this calculation expression is well known, description thereof is omitted here. Any one of various indices may be adopted as the color difference in the present embodiment.

Figure 1:
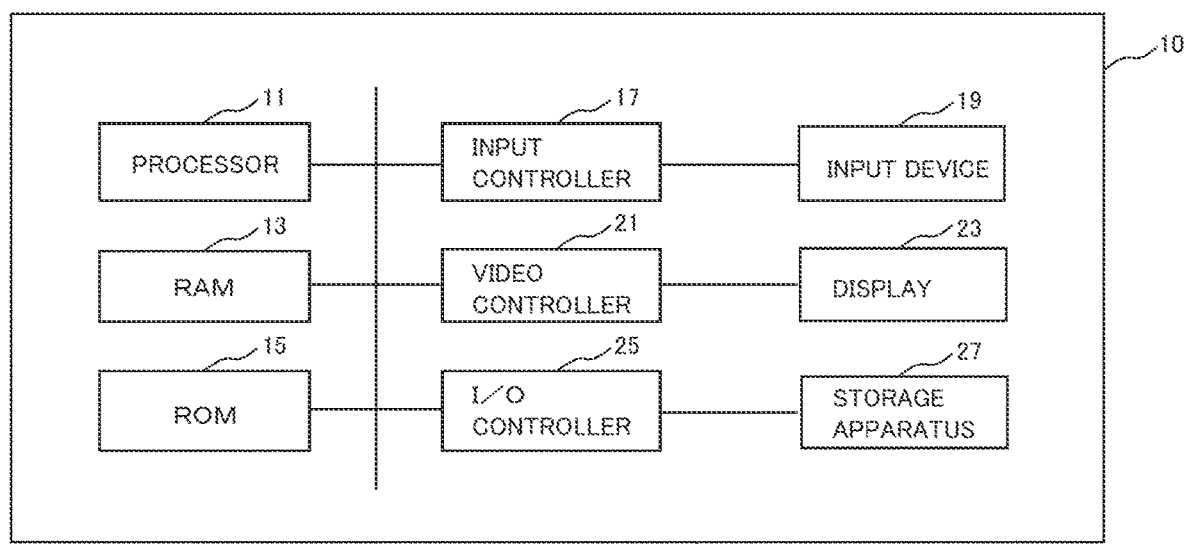
FIG. 1 is a diagram illustrating a configuration of an information processing apparatus according to the present embodiment.

FIG. 1 is a block diagram illustrating a configuration of an information processing apparatus 10 according to the present embodiment. The information processing apparatus 10 is implemented by a computer to execute a content creation process for creating a content such as a document, a diagram (graph), a design (illustration) or an image, and includes a processor 11, a RAM 13, a ROM 15, an input controller 17, an input device 19, a video controller 21, a display 23, an I/O controller 25 and a storage apparatus 27. The processor 11 is constructed of, for example, a CPU (central processing unit) and a GPU (graphics processing unit), executes various programs stored in the ROM 15 to implement various processing functions. The RAM 13 functions as a main memory or a work area or the like of the processor 11. The processor 11 loads a program or the like necessary to execute the processing from the ROM 15 or the storage apparatus 27 into the RAM 13 and executes the loaded program to thereby implement various operations. The ROM 15 or the storage apparatus 27 stores various programs necessary to implement various functions such as a BIOS (basic input output system) executed by the processor 11, the operating system program (OS) or various application programs, various files processed by the various programs or various data or the like. The various application programs include a content creation processing program, and further a color palette providing program to provide a color palette according to the present embodiment provided as a plug-in for the content creation processing program as a user interface. The color palette is made up of a plurality of color parts with which a plurality of color codes are associated, and when any one color part is specified by the user, a color code corresponding to the color part is delivered to the content creation processing program and a color of the content specification region is specified.

The input controller 17 controls an input from the input device 19 such as a pointing device, for example, a keyboard (KB), a mouse or a touch panel. The video controller 21 controls a display of the display 23 such as an LCD (liquid crystal display) under the control of the processor 11. The I/O controller 25 controls access to the storage apparatus 27. The storage apparatus 27 stores content element data such as images or sentences and a content file being edited. Files or data stored in the storage apparatus 27 are read as required along with the execution of the content creation processing program and stored in the RAM 13. In addition, the information processing apparatus 10 is provided with a communication controller that controls communication with an external information processing terminal via a network.

Figure 2:
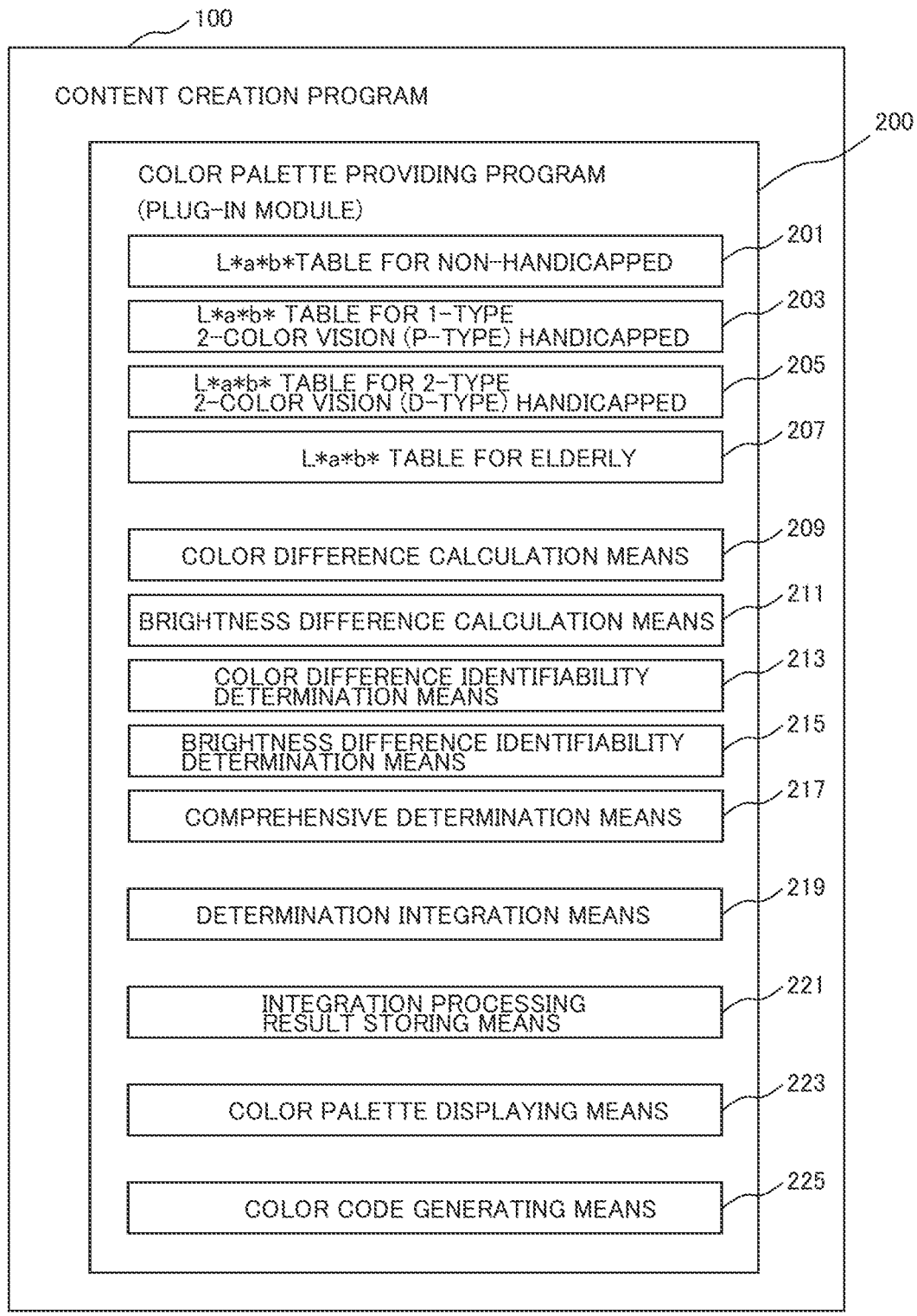
FIG. 2 is a functional configuration diagram of a color palette providing program according to the present embodiment.
Figure 3:
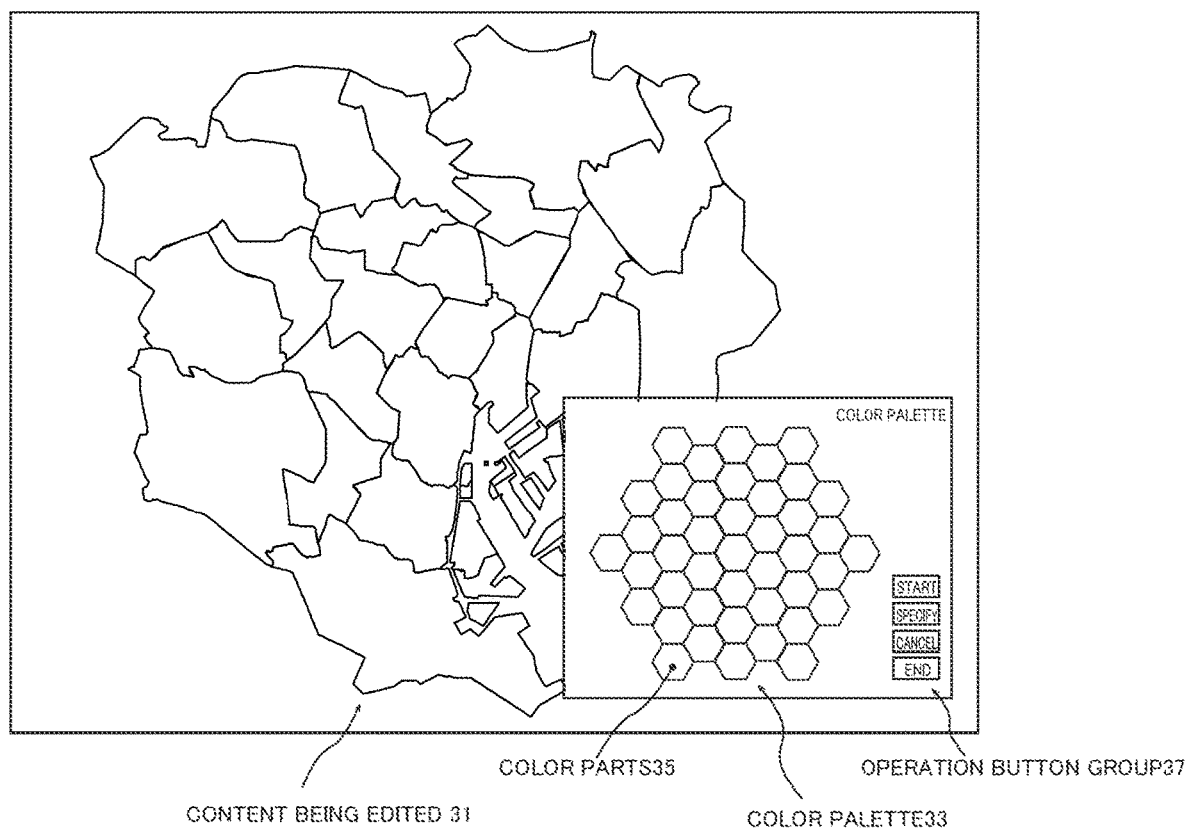
FIG. 3 is a diagram illustrating an example of a color palette provided by the color palette providing program in FIG. 2.

FIG. 2 illustrates a functional configuration of a color palette providing program 200 according to the present embodiment. As described above, the color palette providing program 200 provides a color palette 33 as a user interface which is provided as a plug-in for a content creation processing program 100, displayed together with a content 31 which is created/edited by the content creation processing program 100 as illustrated in FIG. 3 to support a color specification operation in each range or each region of the content 31. The color palette 33 is made up of a combination of, for example, 144 color parts 35 in hexagonal shape corresponding to 144 colors. The color palette 33 is accompanied by an operation button group 37. The color palette providing program 200 is provided with an L*a*b* table 201 for the non-handicapped shown in FIG. 4A, two types of L*a*b* table 203 for the 1-type 2-color vision (P-type) handicapped shown in FIG. 4B, an L*a*b* table 205 for the 2-type 2-color vision (U-type) handicapped shown in FIG. 4C and an L*a*b* table 207 for the elderly shown in FIG. 4D. These tables 201, 203, 205 and 207 are stored in the ROM 15 or the storage apparatus 27.

In the L*a*b* table 201 for the non-handicapped, combinations of L* value, a* value and b* value perceived by the non-handicapped are associated with a plurality of, for example, 144 color parts 35 constituting the color palette 33 respectively. Similarly, in the L*a*b* table 203 for the 1-type 2-color vision (P-type) handicapped, combinations of L* value, a* value and b* value perceived by the 1-type 2-color vision (P-type) handicapped are associated with 144 colors respectively, and in the L*a*b* table 205 for the 2-type 2-color vision (D-type) handicapped, combinations of L* value, a* value and b* value perceived by the 2-type 2-color vision (D-type) handicapped are associated with 144 colors respectively. In the L*a*b* table 207 for the elderly, combinations of L* value, a* value and b* value perceived by the elderly are associated with 144 colors respectively.

When the user specifies an arbitrary color part 35 on the color palette 33 via the input device 19, color difference calculation means 209 calculates color differences of the other 143 colors perceived by the non-handicapped with respect to the specified color (reference color) based on the L* value, a* value and b* value on the L*a*b* table 201 for the non-handicapped. As the color difference, either one or both of ΔE76 and ΔE00 is/are calculated.

Similarly, the color difference calculation means 209 calculates color differences of the other 143 colors perceived by the 1-type 2-color vision (P-type) handicapped with respect to the specified color based on the L* value, a* value and b* value on the L*a*b* table 203 for the 1-type 2-color vision (P-type) handicapped. Furthermore, the color difference calculation means 209 calculates color differences of the other 143 colors perceived by the 2-type 2-color vision (D-type) handicapped with respect to the specified color based on the L* value, a* value and b* value on the L*a*b* table 205 for the 2-type 2-color vision (D-type) handicapped. Furthermore, the color difference calculation means 209 calculates color differences of the other 143 colors perceived by the elderly with respect to the specified color based on the L* value, a* value and b* value on the L*a*b* table 207 for the elderly. Thus, the color difference calculation means 209 calculates respective color differences of the other 143 colors with respect to the specified color (reference color) for each of the non-handicapped, the 1-type 2-color vision (P-type) handicapped, the 2-type 2-color vision (D-type) handicapped and the elderly separately.

When the user specifies an arbitrary color part 35 on the color palette 33 via the input device 19, brightness difference calculation means 211 calculates respective brightness differences of the other 143 colors perceived by the non-handicapped with respect to the specified color (reference color) based on the L* value on the L*a*b* table 201 for the non-handicapped. Similarly, the brightness difference calculation means 211 calculates respective brightness differences of the other 143 colors perceived by the 1-type 2-color vision (P-type) handicapped with respect to the specified color based on the L* value on the L*a*b* table 203 for the 1-type 2-color vision (P-type) handicapped. Furthermore, the brightness difference calculation means 211 calculates respective brightness differences of the other 143 colors perceived by the 2-type 2-color vision (D-type) handicapped with respect to the specified color based on the L* value on the L*a*b* table 205 for the 2-type 2-color vision (D-type) handicapped. Furthermore, the brightness difference calculation means 211 calculates respective brightness differences of the other 143 colors perceived by the elderly with respect to the specified color based on the L* value on the L*a*b* table 207 for the elderly. Thus, the brightness difference calculation means 211 calculates the respective color differences of the other 143 colors with respect to the specified color (reference color) for each of the non-handicapped, the 1-type 2-color vision (P-type) handicapped, the 2-type 2-color vision (D-type) handicapped and the elderly separately.

Note that it may be possible to also calculate color differences and brightness differences of all the other colors in advance for all the colors on the color palette 33 using the respective colors as references, cause the ROM 15 or the storage apparatus 27 to store the color difference/brightness difference table for the non-handicapped, the color difference/brightness difference table for the 1-type 2-color vision (P-type) handicapped, the color difference/brightness difference table for the 2-type 2-color vision (D-type) handicapped and the color difference/brightness difference table for the elderly, in each of which tables, with respect to each of the 144 colors, color differences and brightness differences of the other 143 colors are associated therewith, and read the color differences and the brightness differences of the other colors with respect to the specified color from these tables.

Color difference identifiability determination means 213 compares the color difference with respect to the specified color calculated by the color difference calculation means 209 using the L*a*b* table 201 for the non-handicapped with a threshold set for the non-handicapped and determines whether or not the non-handicapped can identify the color differences between the specified color and the other colors, that is, identifiability against the other 143 colors respectively according to the comparison result. When the color difference from the specified color reaches the threshold, the color difference identifiability determination means 213 determines that the color has color difference identifiability with respect to the specified color or determines, when the color difference with respect to the specified color is less than the threshold, that the color has no color difference identifiability with respect to the specified color. Note that when either $\Delta E76$ or $\Delta E00$ is set as the color difference, the color difference identifiability determination means 213 determines the color difference identifiability according to the comparison result between either one of the two and the threshold or determines, when both $\Delta E76$ and $\Delta E00$ are set as the color difference, that the color has the color difference identifiability when both $\Delta E76$ and $\Delta E00$ reach the threshold. The threshold relating to the color difference is individually set in advance for each of the non-handicapped, the 1-type 2-color vision (P-type) handicapped, the 2-type 2-color vision (D-type) handicapped and the elderly. Furthermore, the threshold can be changed arbitrarily.

Similarly, the color difference identifiability determination means 213 compares the color difference with respect to the specified color calculated by the color difference calculation means 209 using the L*a*b* table 203 for the 1-type 2-color vision (P-type) handicapped with a threshold set for the 1-type 2-color vision (P-type) handicapped and determines whether or not the 1-type 2-color vision (P-type) handicapped can identify the color difference between the specified color and the other colors, that is, identifiability against the other 143 colors respectively according to the comparison result. The color difference identifiability determination means 213 compares the color difference with respect to the specified color calculated by the color difference calculation means 209 using the L*a*b* table 205 for the 2-type 2-color vision (D-type) handicapped with a threshold set for the 2-type 2-color vision (D-type) handicapped and determines whether or not the 2-type 2-color vision (D-type) handicapped can identify the color difference between the specified color and the other colors, that is, identifiability against the other 143 colors respectively according to the comparison result. The color difference identifiability determination means 213 compares the color difference with respect to the specified color calculated by the color difference calculation means 209 using the L*a*b* table 207 for the elderly with a threshold set for the elderly and determines whether or not the elderly can identify the color difference between the specified color and the other colors, that is, identifiability against the other 143 colors respectively according to the comparison result. Thus, the color difference identifiability determination means 213 determines the color difference identifiability as to whether or not the color difference of each of the other colors from the specified color is identifiable for each of the non-handicapped, the 1-type 2-color vision (P-type) handicapped, the 2-type 2-color vision (D-type) handicapped and the elderly.

Brightness difference identifiability determination means 215 compares the brightness difference with respect to the specified color calculated by the brightness difference calculation means 211 using the L*a*b* table 201 for the non-handicapped with a threshold set for the non-handicapped and determines whether or not the non-handicapped can identify the brightness difference between the specified color and the other colors, that is, brightness difference identifiability against the other 143 colors respectively according to the comparison result. When the brightness difference from the specified color reaches the threshold, the brightness difference identifiability determination means 215 determines that the color has brightness difference identifiability or determines, when the brightness difference from the specified color is less than the threshold, that the color has no brightness difference identifiability. Similarly, the brightness difference identifiability determination means 215 compares the brightness difference with respect to the specified color calculated by the brightness difference calculation means 211 using the L*a*b* table 203 for the 1-type 2-color vision (P-type) handicapped with a threshold set for the 1-type 2-color vision (P-type) handicapped and determines whether or not the 1-type 2-color vision (P-type) handicapped can identify the brightness difference between the specified color and the other colors, that is, brightness difference identifiability against the other 143 colors respectively according to the comparison result. The brightness difference identifiability determination means 215 compares the brightness difference with respect to the specified color calculated by the brightness difference calculation means 211 using the L*a*b* table 205 for the 2-type 2-color vision (D-type) handicapped with a threshold set for the 2-type 2-color vision (D-type) handicapped and determines whether or not the 2-type 2-color vision (D-type) handicapped can identify the color difference between the specified color and the other colors, that is, brightness difference identifiability against the other 143 colors respectively according to the comparison result. The brightness difference identifiability determination means 215 compares the brightness difference with respect to the specified color calculated by the brightness difference calculation means 211 using the L*a*b* table 207 for the elderly with a threshold set for the elderly and determines whether or not the elderly can identify the brightness difference between the specified color and the other colors, that is, brightness difference identifiability against the other 143 colors respectively according to the comparison result. Thus, the brightness difference identifiability determination means 215 determines the brightness difference identifiability as to whether or not the brightness difference of each of the other colors with respect to the specified color is identifiable to the non-handicapped, the 1-type 2-color vision (P-type) handicapped, the 2-type 2-color vision (D-type) handicapped and the elderly.

Comprehensive determination means 217 comprehensively determines the determination result relating to the "color difference identifiability of the other colors with respect to the specified color" determined by the color difference identifiability determination means 213 regarding the non-handicapped and the determination result relating to the "brightness difference identifiability of the other colors with respect to the specified color" determined by the brightness difference identifiability determination means 215 regarding the non-handicapped and identifies a color group for which the non-handicapped are provided with both color difference identifiability and brightness difference identifiability with respect to the specified color. Similarly, the comprehensive determination means 217 comprehensively determines the determination result relating to the "color difference identifiability of the other colors with respect to the specified color" determined by the color difference identifiability determination means 213 regarding the 1-type 2-color vision (P-type) handicapped and the determination result relating to the "brightness difference identifiability of the other colors with respect to the specified color" determined by the brightness difference identifiability determination means 215 regarding the 1-type 2-color vision (P-type) handicapped and identifies a color group for which the 1-type 2-color vision (P-type) handicapped are provided with both color difference identifiability and brightness difference identifiability with respect to the specified color. Furthermore, the comprehensive determination means 217 comprehensively determines the determination result relating to the "color difference identifiability of the other colors with respect to the specified color" determined by the color difference identifiability determination means 213 regarding the 2-type 2-color vision (D-type) handicapped and the determination result relating to the "brightness difference identifiability of the other colors with respect to the specified color" determined by the brightness difference identifiability determination means 215 regarding the 2-type 2-color vision (D-type) handicapped and identifies a color group for which the 2-type 2-color vision (D-type) handicapped are provided with both color difference identifiability and brightness difference identifiability with respect to the specified color. Furthermore, the comprehensive determination means 217 comprehensively determines the determination result relating to the "color difference identifiability of the other colors with respect to the specified color" determined by the color difference identifiability determination means 213 regarding the elderly and the determination result relating to the "brightness difference identifiability of the other colors with respect to the specified color" determined by the brightness difference identifiability determination means 215 regarding the elderly and identifies a color group for which the elderly are provided with both color difference identifiability and brightness difference identifiability with respect to the specified color. Thus, the comprehensive determination means 217 identifies a color group provided with both color difference identifiability and brightness difference identifiability with respect to the specified color for each of the non-handicapped, the 1-type 2-color vision (P-type) handicapped, the 2-type 2-color vision (D-type) handicapped and the elderly.

Determination integration means 219 integrates by logical AND, the color group for which the non-handicapped are provided with color difference identifiability and brightness difference identifiability identified by the comprehensive determination means 217 through comprehensive determination, the color group for which the 1-type 2-color vision (P-type) handicapped are provided with color difference identifiability and brightness difference identifiability, the color group for which the 2-type 2-color vision (D-type) handicapped are provided with color difference identifiability and brightness difference identifiability, and the color group for which the elderly are provided with color difference identifiability and brightness difference identifiability to thereby finally identify the color group for which not only the non-handicapped but also all types of people: the 1-type 2-color vision (P-type) handicapped, the 2-type 2-color vision (D-type) handicapped, and further the elderly are provided with both color difference identifiability and brightness difference identifiability with respect to the specified color.

Integration processing result storing means 221 stores the integration processing result of the determination integration means 219, that is, data relating to a color group (referred to as a "universal color group") for which all the non-handicapped, the 1-type 2-color vision (P-type) handicapped, the 2-type 2-color vision (D-type) handicapped and the elderly are commonly provided with color difference identifiability and brightness difference identifiability. By storing the data of the universal color group, when specifying a plurality of colors, that is, three or more colors sequentially, it is possible to limit targets of determination processing about color difference identifiability and brightness difference identifiability to the universal color group as an immediately preceding integration processing result. It is thereby possible to cumulatively narrow down the candidate colors for the third and subsequent colors to the color group for which all the non-handicapped, the 1-type 2-color vision (P-type) handicapped, the 2-type 2-color vision (D-type) handicapped and the elderly are commonly provided with color difference and brightness difference identifiability for all the two or more colors specified before. It is possible to specify a plurality of colors, that is, three or more colors for which all the non-handicapped, the 1-type 2-color vision (P-type) handicapped, the 2-type 2-color vision (D-type) handicapped and the elderly are commonly provided with color difference and brightness difference identifiability.

Color palette displaying means 223 generates display data of the color palette 33. The color palette 33 is formed by integrating, for example, 144 color parts 35 in hexagonal shape or the like corresponding to 144 colors. The color palette 33 is accompanied by the operation button group 37. The color palette displaying means 223 initially displays all the color parts 35 in a user specifiable active mode. When specifying a second or subsequent colors, the color palette displaying means 223 displays color parts of the universal color group in the user specifiable active mode as they are according to the integration processing result of the determination integration means 219 and switches color parts of color groups other than the universal color group to the user unspecifiable inactive mode. Color code generating means 225 delivers color codes of colors specified by the color parts 35 on the color palette 33 to the content creation processing program.

Figure 5:
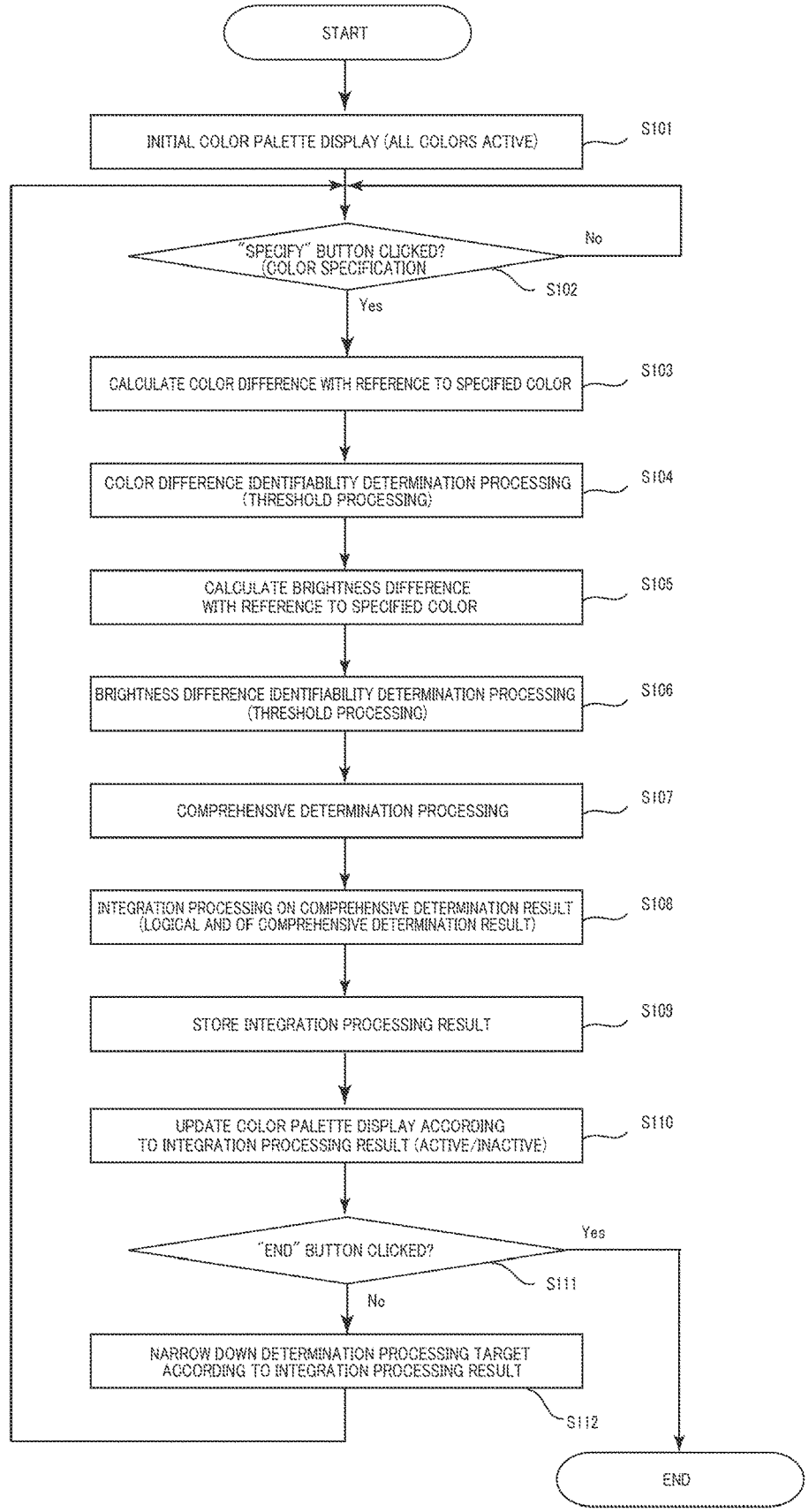
FIG. 5 is a flowchart illustrating a processing procedure of the color palette providing program in FIG. 2.
Figure 6A:
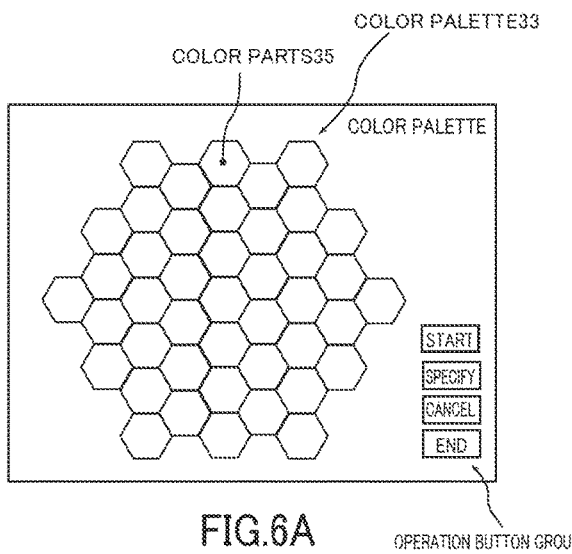
FIGS. 6A, 6B, 6C, 6D, 6E, and 6F are diagrams illustrating display transition of the color palette provided by the color palette providing program in FIG. 2.
Figure 6D:
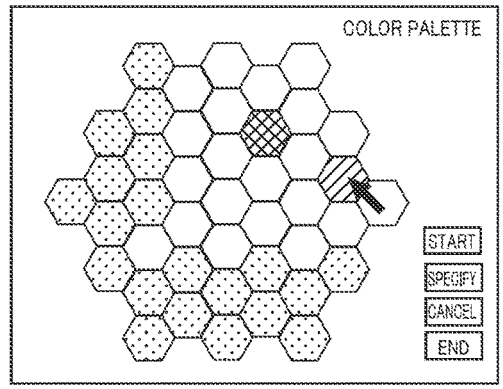
Figure 6B:
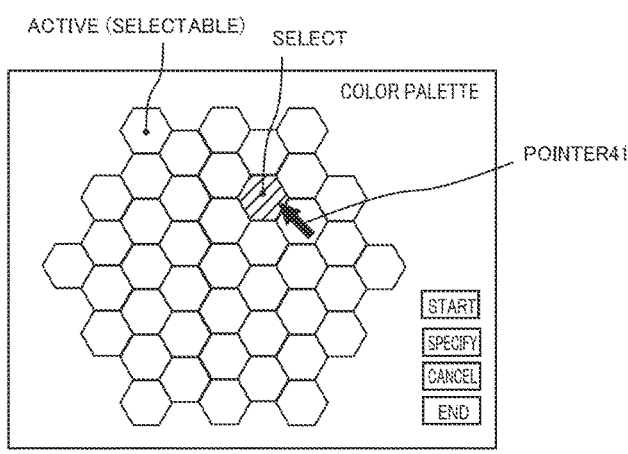
Figure 6E:
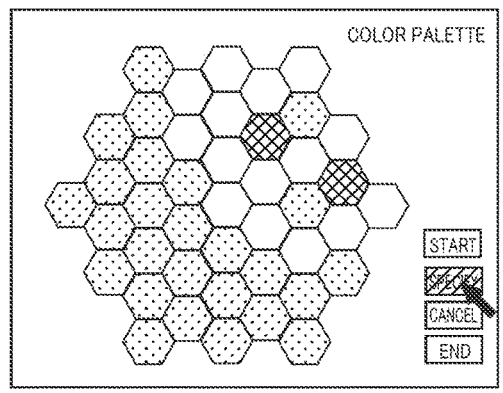

FIG. 5 illustrates a processing procedure by the color palette providing program according to the present embodiment, FIGS. 6A to 6F illustrate display transitions of the color palette and FIGS. 7A to 7E illustrate examples of the comprehensive determination processing result and the integration processing result. When the content creation processing program for creating a content such as a document, design or image is started, the color palette displaying means 223 initially displays the color palette 33 as shown in FIG. 6A (step S101). The initial color palette 33 displays all the color parts 35 in an active mode in which the user can specify those colors. As shown in FIG. 6B, when the user operates the mouse to move a pointer 41 to the color part 35 in an arbitrary color and performs a click operation at the position, the display mode of the color part 35 is changed by the color palette displaying means 223 to a mode for displaying the selection state.

Next, when a "Specify" button of the operation button group 37 is clicked (step S102; Yes), the color difference calculation means 209 calculates the respective color differences of the other 143 colors with respect to the specified color (reference color) for each of the non-handicapped, the 1-type 2-color vision (P-type) handicapped, the 2-type 2-color vision (D-type) handicapped and the elderly individually (step S103). As the color difference, either ΔE76 or ΔE00 is typically selected in advance, but both ΔE76 and ΔE00 may also be set in advance as the color differences.

The color difference identifiability determination means 213 provides the color differences of the other 143 colors calculated by the color difference calculation means 209 for the threshold processing. The color difference identifiability determination means 213 thereby determines whether or not the non-handicapped, the 1-type 2-color vision (P-type) handicapped, the 2-type 2-color vision (D-type) handicapped or the elderly can identify color differences of the other respective 143 colors with respect to the specified color, that is, identifiability (step S104). When the color difference reaches the threshold, the color difference identifiability determination means 213 determines that the non-handicapped, the 1-type 2-color vision (P-type) handicapped, the 2-type 2-color vision (D-type) handicapped or the elderly can identify the color differences (circle marks in FIGS. 7A to 7E) or determines that the non-handicapped, the 1-type 2-color vision (P-type) handicapped, the 2-type 2-color vision (D-type) handicapped or the elderly cannot identify the color differences when the color differences are less than the threshold (x marks in FIGS. 7A to 7E). Note that when either ΔE76 or ΔE00 is set as the color difference, identifiability is determined according to the comparison result between either one of the two and the threshold and when both ΔE76 and ΔE00 are set as the color difference, color difference identifiability is determined to exist when both ΔE76 and ΔE00 reach the threshold.

The brightness difference calculation means 211 calculates brightness differences of the other 143 respective colors with respect to the specified color (reference color) for each of the non-handicapped, the 1-type 2-color vision (P-type) handicapped, the 2-type 2-color vision (D-type) handicapped or the elderly individually (step S105). More specifically, the brightness differences of the other 143 respective colors perceived by the non-handicapped with respect to the specified color (reference color) are calculated based on the L* value on the L*a*b* table 201 for the non-handicapped. Similarly, the brightness differences of the other 143 respective colors perceived by the 1-type 2-color vision (P-type) handicapped with respect to the specified color are calculated based on the L* value on the L*a*b* table 203 for the 1-type 2-color vision (P-type) handicapped, the brightness differences of the other 143 respective colors perceived by the 2-type 2-color vision (D-type) handicapped with respect to the specified color are calculated based on the L* value on the L*a*b* table 205 for the 2-type 2-color vision (D-type) handicapped, the brightness differences of the other 143 respective colors perceived by the elderly with respect to the specified color are calculated based on the L* value on the L*a*b* table 207 for the elderly.

The brightness difference identifiability determination means 215 provides the respective brightness differences of the other 143 respective colors calculated by the brightness difference calculation means 211 for threshold processing. Thus, the brightness difference identifiability determination means 215 determines whether or not the non-handicapped, the 1-type 2-color vision (P-type) handicapped, the 2-type 2-color vision (D-type) handicapped and the elderly can individually identify respective brightness differences of the other 143 colors with respect to the specified color, that is, identifiability (step S106). When the brightness difference reaches a threshold, the brightness difference identifiability determination means 215 determines that the non-handicapped, the 1-type 2-color vision (P-type) handicapped, the 2-type 2-color vision (D-type) handicapped or the elderly can identify the brightness difference or determines that the non-handicapped, the 1-type 2-color vision (P-type) handicapped, the 2-type 2-color vision (D-type) handicapped or the elderly cannot identify the brightness difference when the brightness difference is less than the threshold.

As shown in FIG. 7A, after the color difference identifiability determination processing and the brightness difference identifiability determination processing are completed, the comprehensive determination means 217 determines whether or not the non-handicapped are provided with both color difference identifiability and brightness difference identifiability with respect to the specified color based on the determination result of color difference identifiability relating to the non-handicapped and the determination result of brightness difference identifiability relating to the non-handicapped for other colors other than the specified color individually (step 107). Similarly, as shown in FIG. 7B, FIG. 7C and FIG. 7D, the comprehensive determination means 217 determines whether or not the 1-type 2-color vision (P-type) handicapped, 2-type 2-color vision (D-type) handicapped and the elderly are provided with both color difference identifiability and brightness difference identifiability with respect to the specified color for colors other than the specified color individually. The comprehensive determination processing identifies the color group provided with both the color difference identifiability and the brightness difference identifiability with respect to the specified color for each of the non-handicapped, the 1-type 2-color vision (P-type) handicapped, the 2-type 2-color vision (D-type) handicapped or the elderly.

Next, as shown in FIG. 7D, the determination integration means 219 integrates the comprehensive determination result relating to the non-handicapped by the comprehensive determination means 217, the comprehensive determination result relating to the 1-type 2-color vision (P-type) handicapped, the comprehensive determination result relating to the 2-type 2-color vision (D-type) handicapped and the comprehensive determination result relating to the elderly (step S108). That, is, the comprehensive determination means 217 extracts a result of logical AND among the color group for which the non-handicapped are provided with both color difference identifiability and brightness difference identifiability with respect to the specified color, the color group for which the 1-type 2-color vision (P-type) handicapped are provided with both color difference identifiability and brightness difference identifiability with respect to the specified color, the color group for which the 2-type 2-color vision (D-type) handicapped are provided with both color difference identifiability and brightness difference identifiability with respect to the specified color, and the color group for which the elderly are provided with both color difference identifiability and brightness difference identifiability with respect to the specified color. This makes it possible to identify a color group (universal color group) for which the non-handicapped, the 1-type 2-color vision (P-type) handicapped, the 2-type 2-color vision (D-type) handicapped and the elderly are commonly provided with both color difference identifiability and brightness difference identifiability with respect to the specified color. This integration processing result is stored (step S109).

Figure 6C:
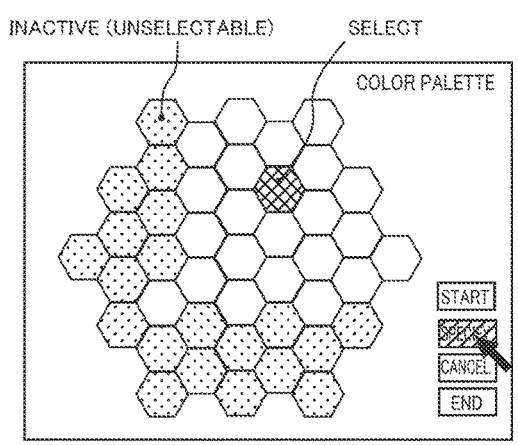

As shown in FIG. 6C, the color part 35 of the universal color group is displayed as is by the color palette displaying means 223 in the user specifiable active mode and the color parts 35 of color groups other than the universal color group are switched to the user unspecifiable inactive mode according to this integration processing result (step S110).

Since the color parts 35 of color groups other than the universal color group are displayed in the inactive mode, the user can intuitively recognize which colors are unspecifiable and which colors are specifiable. For example, when a color to be specified is decided and the color part in that color is displayed in the inactive mode, it is understandable that the color is not specifiable. In such a case, it is possible to immediately decide to cancel the first specified color and resume the specification operation from the first color.

The next color can be selected from among the color parts 35 displayed in the active mode. The user can recognize the color group, both color difference and brightness difference of which are identifiable to all the non-handicapped, the 1-type 2-color vision (P-type) handicapped, the 2-type 2-color vision (D-type) handicapped and the elderly with respect to the specified color as a candidate for the next specified color. If the candidate for the next specified color is unexpected at this point in time, the specification of the color in step S102 can be canceled by clicking on the "Cancel" button of the operation button group 37. Clicking on the "End" button of the operation button group 37 (step S111; Yes) causes the color palette providing program to end and hides the color palette. When the "End" button of the operation button group 37 is not clicked (step S111; No), the calculation/determination processing (S103 to S108) target is narrowed down to the integration processing result (universal color group) in immediately preceding step S108 (step S112), the process is returned to step S102 to wait for the next color to be specified from among the color parts 35 displayed in the active mode.

When the next color is selected and specified as shown in FIG. 6D and FIG. GE, the target is narrowed down to the integration processing result (universal color group) in immediately preceding step S108, a color difference and a brightness difference for the next specified color are calculated (S103, S105), the color difference identifiability and brightness difference identifiability are determined individually (S104, S106), identifiability for the next specified color is comprehensively determined for each of the non-handicapped, the 1-type 2-color vision (P-type) handicapped, the 2-type 2-color vision (D-type) handicapped or the elderly based on the color difference identifiability determination result and the brightness difference identifiability determination result (S107), the comprehensive determination results thereof are integrated to thereby specify the color group (universal color group) for which all the non-handicapped, the 1-type 2-color vision (P-type) handicapped, the 2-type 2-color vision (D-type) handicapped and the elderly can identify the color difference for the next specified color and can identify the brightness difference for the next specified color.

Figure 6F:
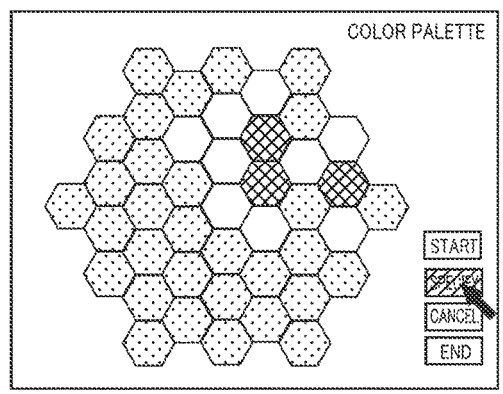

The color parts 35 of both the universal color group provided with comprehensive identifiability with respect to the next specified color and the universal color group provided with comprehensive identifiability with respect to the first specified color are displayed in the active mode and the color parts 35 of other color groups are displayed in the inactive mode. Apparently, the color parts 35 of colors not provided with identifiability of color groups other than the universal color group provided with comprehensive identifiability with respect to the first specified color are maintained as they are in the inactive mode, and the color parts 35 of colors not provided with identifiability of color groups other than the universal color group provided with comprehensive identifiability with respect to the next specified color are switched from the active mode to the inactive mode. When a third color is specified, an inactive mode of the color parts 35 of color groups other than the universal color group provided with comprehensive identifiability with respect to the specified color for the third color is further added (FIG. 6F).

Thus, according to the present embodiment, when a certain color on the color palette is specified, a color group (universal color group) for which not only the color vision handicapped but also the non-handicapped and the elderly are further comprehensively provided with color difference identifiability and brightness difference identifiability is specified, the color parts as the next specifiable color candidate are displayed in the active mode and the color parts of unspecifiable colors are displayed in the inactive mode. And therefore, by specifying a color according to the display mode, the user can easily specify a clearly identifiable color from both standpoints of color difference and brightness difference commonly for all the non-handicapped, the color vision handicapped and the elderly. Furthermore, when three or more colors are sequentially specified, color parts of colors provided with identifiability with respect to all the colors specified before are displayed in the active mode and specifiable colors are sequentially narrowed down, which can drastically reduce the burden of specification operation of three or more colors.

Note that although the non-handicapped, the 1-type 2-color vision (P-type) handicapped, the 2-type 2-color vision (D-type) handicapped and the elderly are assumed to be targets in the above description, the color vision handicapped need not be limited to classification of these two types, and the 3-color vision handicapped may be added to these targets or only one type of the color vision handicapped may be assumed to be the target. Furthermore, depending on the types of content, identifiability may be determined for only the non-handicapped and the elderly as targets.

Although when the second and subsequent colors are specified, the color parts of the universal color group are displayed as they are in the user specifiable active mode and the color parts of color groups other than the universal color group are displayed, changed to the user unspecifiable inactive mode according to the integration processing result in the above description, the embodiment may be configured so that only the color parts of the universal color group are displayed and the color parts of color groups other than the universal color group are not displayed so as to prevent the user from specifying such color parts. For example, when the number of color candidates to be selected is several hundred or further an enormous number exceeding 1000, it may be more convenient if the color parts of user unspecifiable colors are excluded from the display targets and only color parts of user specifiable colors are displayed instead of displaying the color parts of user unspecifiable colors, changed to the inactive mode.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A non-transitory computer-readable medium storing instructions executable by a computer for providing a color palette which is provided as a plug-in for content creation software as a user interface to cause the computer to sequentially implement the steps of:
   allowing a user to specify one color out of a selectable color group;
   calculating color differences of other colors with respect to the specified color specified by the user according to an L* value, an a* value and a b* value using a table for the non-handicapped, a table for the color vision handicapped and a table for the elderly, in which tables combinations of the L* value, the a* value and the b* value are associated with a plurality of colors provided in a plurality of color parts that constitute the color palette respectively;
   determining color difference identifiability with respect to the specified color for each of the non-handicapped, the color vision handicapped and the elderly, through threshold processing on the calculated color differences;
   calculating brightness differences of other colors with respect to the specified color according to the L* value using the table for the non-handicapped, the table for the color vision handicapped and the table for the elderly respectively;
   determining brightness difference identifiability with respect to the specified color through threshold processing on the calculated brightness difference for each of the other colors for each of the non-handicapped, the color vision handicapped and the elderly;
   identifying a color group for which the non-handicapped are provided with color difference identifiability and brightness difference identifiability with respect to the specified color, a color group for which the color vision handicapped are provided with color difference identifiability and brightness difference identifiability with respect to the specified color and a color group for which the elderly are provided with color difference identifiability and brightness difference identifiability with respect to the specified color, based on the color difference identifiability and the brightness difference identifiability, respectively;
   integrating the color group for which the non-handicapped are provided with color difference identifiability and brightness difference identifiability, the color group for which the color vision handicapped are provided with color difference identifiability and brightness difference identifiability and the color group for which the elderly are provided with color difference identifiability and brightness difference identifiability, by logical AND, so as to extract an integrated color group of color parts on the color palette, wherein each of the color parts is associated with a color code; and
   switching a display mode of each of the color parts that constitute the color palette between a user specifiable active mode and a user unspecifiable inactive mode according to the integrated color group,
   wherein the integrated color group is displayed on the color palette in the user specifiable active mode, so as to be selectable by the user;
   wherein a color group other than the integrated color group is displayed on the color palette in the user unspecifiable inactive mode, so as to be unselectable by the user; and
   wherein:
   the sequentially implemented steps is repeated, such that the color palette in the user specifiable active mode in the sequentially implemented steps is employed as the selectable color group in a next sequence of the steps; and
   by repeating the sequentially implemented steps, while continuing to narrow down the color palette in the user specifiable active mode, the computer aggregates the colors specified by the user so as to construct a user's color palette, in which all color parts are identifiable by the non-handicapped, the color vision handicapped, and the elderly, with respect to color differences and brightness differences.

2. A non-transitory computer-readable medium storing instructions executable by a computer for providing a color palette which is provided as a plug-in for content creation software as a user interface to cause the computer to sequentially implement the steps of:
   allowing a user to specify one color out of a selectable color group;
   specifying color differences and brightness differences of other colors with respect to the specified color specified by the user using a table for the non- handicapped, a table for the color vision handicapped and a table for the elderly respectively, in which tables, with respect to each of a plurality of colors provided in a plurality of color parts that constitute the color palette, color differences and brightness differences of the other colors are associated therewith respectively;
   determining color difference identifiability with respect to the specified color through threshold processing on the specified color difference for each of the other colors for each of the non-handicapped, the color vision handicapped and the elderly;
   determining the brightness difference identifiability with respect to the specified color for each of the other colors for each of the non-handicapped, the color vision handicapped and the elderly, through threshold processing on the specified brightness difference;
   identifying a color group for which the non-handicapped are provided with color difference identifiability and brightness difference identifiability with respect to the specified color, a color group for which the color vision handicapped are provided with color difference identifiability and brightness difference identifiability with respect to the specified color and a color group for which the elderly are provided with color difference identifiability and brightness difference identifiability with respect to the specified color based on the color difference identifiability and the brightness difference identifiability respectively;

integrating the color group for which the non-handicapped are provided with color difference identifiability and brightness difference identifiability, the color group for which the color vision handicapped are provided with color difference identifiability and brightness difference identifiability and the color group for which the elderly are provided with color difference identifiability and brightness difference identifiability, by logical AND, so as to extract an integrated color group of color parts on the color palette, wherein each of the color parts is associated with a color code; and switching a display mode of each of the color parts that constitute the color palette between a user specifiable active mode and a user unspecifiable inactive mode according to the integrated color group, wherein, the integrated color group is displayed on the color palette in the user specifiable active mode, so as to be selectable by the user;

wherein, a color group other than the integrated color group is displayed on the color palette in the user unspecifiable inactive mode, so as to be unselectable by the user; and wherein:

the sequentially implemented steps is repeated, such that the color palette in the user specifiable active mode in the sequentially implemented steps is employed as the selectable color group in a next sequence of the steps; and by repeating the sequentially implemented steps, while continuing to narrow down the color palette in the user specifiable active mode, the computer aggregates the colors specified by the user so as to construct a user's color palette, in which all color parts are identifiable by the non-handicapped, the color vision handicapped, and the elderly, with respect to color differences and brightness differences.

3. A non-transitory computer-readable medium storing instructions executable by a computer program for providing a color palette which is provided as a plug-in for content creation software as a user interface to cause the computer to sequentially implement the steps of:

allowing a user to specify one color out of a selectable color group;

calculating color differences of other colors with respect to the specified color specified by the user using a table for the non-handicapped and a table for the elderly respectively, in which tables combinations of an L* value, an a* value and a b* value are associated with a plurality of colors provided in a plurality of color parts that constitute the color palette, respectively according to the L* value, the a* value and the b* value;

determining color difference identifiability with respect to the specified color through threshold processing on the calculated color differences for each of the non-handicapped and the elderly for each of the other colors;

calculating brightness differences of other colors with respect to the specified color using the table for the non-handicapped and the table for the elderly respectively according to the L* value;

determining brightness difference identifiability with respect to the specified color through threshold processing on the calculated brightness difference for each of the non-handicapped and the elderly for each of the other colors;

identifying a color group for which the non-handicapped are provided with color difference identifiability and brightness difference identifiability with respect to the specified color and a color group for which the elderly are provided with color difference identifiability and brightness difference identifiability with respect to the specified color based on the color difference identifiability and the brightness difference identifiability respectively;

integrating the color group for which the non-handicapped are provided with color difference identifiability and brightness difference identifiability and the color group for which the elderly are provided with color difference identifiability and brightness difference identifiability, by logical AND, so as to extract an integrated color group of color parts on the color palette, wherein each of the color parts is associated with a color code; and switching a display mode of each of the color parts that constitute the color palette between a user specifiable active mode and a user unspecifiable inactive mode according to the integrated color group, wherein the integrated color group is displayed on the color palette in the user specifiable active mode, so as to be selectable by the user;

wherein a color group other than the integrated color group is displayed on the color palette in the user unspecifiable inactive mode, so as to be unselectable by the user; and wherein:

the sequentially implemented steps is repeated, such that the color palette in the user specifiable active mode in the sequentially implemented steps is employed as the selectable color group in a next sequence of the steps; and by repeating the sequentially implemented steps, while continuing to narrow down the color palette in the user specifiable active mode, the computer aggregates the colors specified by the user so as to construct a user's color palette, in which all color parts are identifiable by the non-handicapped, the color vision handicapped, and the elderly, with respect to color differences and brightness differences.

4. A non-transitory computer-readable medium storing instructions executable by a computer for providing a color palette which is provided as a plug-in for content creation software as a user interface to cause the computer to sequentially implement the steps of:

allowing a user to specify one color out of a selectable color group;

specifying color differences and brightness differences of other colors with respect to the specified color specified by the user using a table for the non-handicapped and a table for the elderly respectively in which tables, with respect to each of a plurality of colors provided in a plurality of color parts that constitute the color palette, color differences and brightness differences of the other colors are associated therewith respectively;

determining color difference identifiability with respect to the specified color through threshold processing on the specified color difference for each of the non-handicapped and the elderly for each of the other colors;

determining the brightness difference identifiability with respect to the specified color through threshold processing on the specified brightness difference for each of the non-handicapped and the elderly for each of the other colors;

identifying a color group for which the non-handicapped are provided with color difference identifiability and brightness difference identifiability with respect to the specified color and a color group for which the elderly are provided with color difference identifiability and brightness difference identifiability with respect to the specified color based on the color difference identifiability and the brightness difference identifiability respectively;

integrating the color group for which the non-handicapped are provided with color difference identifiability and brightness difference identifiability and the color group for which the elderly are provided with color difference identifiability and brightness difference identifiability, by logical AND, so as to extract an integrated color group of color parts on the color palette, wherein each of the color parts is associated with a color code; and switching a display mode of each of the color parts that constitute the color palette between a user specifiable active mode and a user unspecifiable inactive mode according to the integrated color group, wherein the integrated color group is displayed on the color palette in the user specifiable active mode, so as to be selectable by the user;

wherein a color group other than the integrated color group is displayed on the color palette in the user unspecifiable inactive mode, so as to be unselectable by the user; and wherein:

the sequentially implemented steps is repeated, such that the color palette in the user specifiable active mode in the sequentially implemented steps is employed as the selectable color group in a next sequence of the steps; and by repeating the sequentially implemented steps, while continuing to narrow down the color palette in the user specifiable active mode, the computer aggregates the colors specified by the user so as to construct a user's color palette, in which all color parts are identifiable by the non-handicapped, the color vision handicapped, and the elderly, with respect to color differences and brightness differences.

5. A non-transitory computer-readable medium storing instructions executable by a computer for providing a color palette which is provided as a plug-in for content creation software as a user interface to cause the computer to sequentially implement the steps of:

allowing a user to specify one color out of a selectable color group;

determining color difference identifiability of other colors with respect to the specified color specified by the user among a plurality of colors provided in a plurality of color parts that constitute the color palette for each of the non-handicapped, the color vision handicapped and the elderly;

determining brightness difference identifiability of other colors with respect to the specified color among the plurality of colors for each of the non-handicapped, the color vision handicapped and the elderly;

identifying a color group of color parts for which the non-handicapped, the color vision handicapped and the elderly are commonly provided with color difference identifiability and brightness difference identifiability based on the color difference identifiability and the brightness difference identifiability, wherein each of the color parts is associated with a color code; and switching a display mode of each of the color parts that constitute the color palette between a user specifiable active mode and a user unspecifiable inactive mode according to the identified color group, wherein the identified color group is displayed on the color palette in the user specifiable active mode, so as to be selectable by the user;

wherein a color group other than the indentified color group is displayed on the color palette in the user unspecifiable inactive mode, so as to be unselectable by the user; and wherein:

the sequentially implemented steps is repeated, such that the color palette in the user specifiable active mode in the sequentially implemented steps is employed as the selectable color group in a next sequence of the steps; and by repeating the sequentially implemented steps, while continuing to narrow down the color palette in the user specifiable active mode, the computer aggregates the colors specified by the user so as to construct a user's color palette, in which all color parts are identifiable by the non-handicapped, the color vision handicapped, and the elderly, with respect to color differences and brightness differences.

* * * * *